United States Patent
Ikeuchi

(10) Patent No.: US 10,848,580 B2
(45) Date of Patent: Nov. 24, 2020

(54) INFORMATION PROCESSING SYSTEM AND CONTROL METHOD

(71) Applicant: CANON KABUSHIKI KAISHA, Tokyo (JP)

(72) Inventor: Yuma Ikeuchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 103 days.

(21) Appl. No.: 16/043,766

(22) Filed: Jul. 24, 2018

(65) Prior Publication Data

US 2019/0037041 A1 Jan. 31, 2019

(30) Foreign Application Priority Data

Jul. 27, 2017 (JP) .................. 2017-145474

(51) Int. Cl.
*G06F 15/16* (2006.01)
*H04L 29/08* (2006.01)

(52) U.S. Cl.
CPC ........ *H04L 67/2809* (2013.01); *H04L 67/125* (2013.01)

(58) Field of Classification Search
CPC ...... G06F 9/542; G06Q 10/10; G06Q 10/107; H04L 51/26; H04L 67/16; H04L 67/26; H04L 67/125; H04W 4/70; H04N 1/32765; H04N 1/00244
See application file for complete search history.

(56) References Cited

U.S. PATENT DOCUMENTS

| | | | | |
|---|---|---|---|---|
| 6,154,781 | A * | 11/2000 | Bolam | H04L 67/26 706/62 |
| 7,080,385 | B1 * | 7/2006 | Collison | G06F 9/542 719/310 |
| 9,936,035 | B2 | 4/2018 | Zadorozny et al. | |
| 2008/0104044 | A1 * | 5/2008 | Kardamilas | H04L 67/26 |
| 2009/0187635 | A1 * | 7/2009 | Lobban | G06Q 10/10 709/206 |
| 2011/0055339 | A1 * | 3/2011 | Lobban | G06Q 10/107 709/206 |
| 2012/0215856 | A1 * | 8/2012 | Beardsmore | H04L 51/26 709/206 |

(Continued)

FOREIGN PATENT DOCUMENTS

JP 2016197444 A 11/2016

*Primary Examiner* — Dustin Nguyen
(74) *Attorney, Agent, or Firm* — Rossi, Kimms & McDowell LLP

(57) ABSTRACT

An information processing system including a device information topic that receives a message by using a network device serving as a publisher and a success confirmation topic for delivering a message indicating the success of message processing by using the network device serving as a subscriber is provided. The information processing system registers the processing result in an information management service in response to the completion of the processing in the immediate processing action and the non-immediate processing action of the first message that has been delivered by the device information topic, and in accordance with the processing result, the information processing system delivers a second message indicating the success of the processing of the first message to the success confirmation topic.

8 Claims, 12 Drawing Sheets

(56) References Cited

U.S. PATENT DOCUMENTS

| | | | |
|---|---|---|---|
| 2012/0272252 A1* | 10/2012 | Beardsmore | G06F 9/542 |
| | | | 719/328 |
| 2015/0067154 A1* | 3/2015 | Ly | H04L 67/125 |
| | | | 709/224 |
| 2015/0207857 A1* | 7/2015 | Horton | H04L 67/16 |
| | | | 709/204 |
| 2016/0041534 A1* | 2/2016 | Gupta | H04W 4/70 |
| | | | 700/275 |
| 2018/0097968 A1* | 4/2018 | Sato | H04N 1/32765 |

\* cited by examiner

FIG. 5

```
{
    "messageId": "MESSAGE001",
    "topics" : ["DeviceA/DeviceInfo"],
    "eventType":"CartridgeError",
    "errorCode" : "#XXX"
}
```
500

FIG. 6A

```
{
    "clientId": "ImmediateAction",
    "timeStamp": 1250035403423,
    "eventType": "subscribed",
    "topics" : ["DeviceA/DeviceInfo"]
}
```
600

FIG. 6B

```
{
    "clientId": "StoreAction",
    "timeStamp": 1250035403500,
    "eventType": "subscribed",
    "topics" : ["DeviceA/DeviceInfo"]
}
```
601

FIG. 8A
                                            ~800
```
{
    "clientId": "ImmediateAction",
    "topics" : ["DeviceA/DeviceInfo"],
    "result": "Success",
    "messageId": "MESSAGE001"
}
```

FIG. 8B
                                            ~801
```
{
    "clientId": "StoreAction",
    "topics" : ["DeviceA/DeviceInfo"],
    "result": "Success",
    "messageId": "MESSAGE001"
}
```

```
{
  "messageId": "MESSAGE001",
  "result":"Success"
}
```
900

INFORMATION PROCESSING SYSTEM AND CONTROL METHOD

BACKGROUND OF THE INVENTION

Field of the Invention

The present invention relates to a technique that manages messages using a publication-subscription model.

Description of the Related Art

A system that realizes the "Internet of Things" (hereinafter, referred to as "IoT"), which connects objects serving as clients such as home appliances and automobiles to the Internet, has been proposed. Additionally, as the result of progress of multifunctionalization of image processing apparatuses in recent years, Multifunction Peripheral (MFP) and printers are also compatible with IoT clients. Additionally, IoT is an abbreviation for "Internet of Things". In IoT, since there are an unspecified number of objects to be IoT clients, the IoT system can collect large amounts of information about various objects. In contrast, it is not easy for the IoT system to manage the transmission and reception of information to and from an unspecified number of IoT clients. Accordingly, many systems that realize IoT adopt the "publication-subscription model" as a method for transmitting and receiving messages between the IoT devices and the system. Japanese Patent Application Laid-Open No. 2016-197444 discloses a social networking system realized by using subscribe (Sub) and publish (Pub) in the publication-subscription model. Here, in the publication-subscription model, the arrival of published messages from a publisher to a topic is guaranteed. In contrast, the reception of messages from the topic that has previously been subscribed by the subscriber is not guaranteed. If the subscriber fails to receive messages from Topic, it is a common response that publisher retries Pub. However, in the publication-subscription model, since the publisher and the subscriber independently perform processing, the publisher is not allowed to know the result of the processing in the subscriber. Therefore, there is the drawback that the publisher cannot determine whether or not it should perform a retry of Pub.

As a countermeasure against this drawback, it is contemplated to provide a topic for notifying the system about the result of the processing in the subscriber separately. In this system, if the subscriber has succeeded in the reception processing, the message about the reception success is published to the notification topic. If the publisher receives a message from the notification topic that has been previously submitted, it does not perform a retry of publication. If the publisher cannot receive the message from the notification topic even after a predetermined time has elapsed after first publication by the publisher, the publisher performs a retry of Pub.

Here, in the publication-subscription model, a system in which a plurality of subscribers is present for one topic is assumed. If any one of the receiving processes performed by the subscribers fails, the publisher applies the mechanism of the above-described notification topic in order to perform a retry of Pub. In this case, the publisher needs to subscribe to each of the notification topic for one subscriber and the notification topic for another subscriber. Hence, the operation of the publisher depends on the configuration of the subscriber. The criteria for the determination of a retry of Pub change because, for example, the number of messages to be monitored also increases or decreases according to the determination of a retry of a Pub that has been determined by the publisher in response to the increase or decrease of the subscribers. Consequently, such a mechanism causes loss in loose coupling between the subscriber and the publisher, which was an advantage in the publication-subscription model. Therefore, the present invention is to provide a mechanism that can guarantee the delivery of messages to the subscriber while maintaining the loose coupling between the subscriber and the publisher.

SUMMARY OF THE INVENTION

An information processing system comprising a network device and a message management system including a first message management service for delivering a message from the network device serving as a publisher to a plurality of subscribers and a second message management service for delivering a message indicating the success of the processing of the message, wherein the network device comprises: a memory storing instructions; and a processor executing the instructions causing the network device to request the second message management service to register a subscription and notify the first message management service about a first message, wherein the message management system comprises: a memory storing instructions and a processor executing the instructions causing the message management system to register a processing result of the first message in the first subscriber in an information management service in response to the completion of processing in a first service of the first message delivered by the first message management service, register the processing result of the first message in the second subscriber in the information management service in response to the completion of processing in a second service of the first message delivered by the first message management service, and notify the second message management service about a second message indicating the success of the processing of the first message in accordance with the processing result of the first message registered in the information management service, wherein the subscribers of the first message management service are the first service and the second service, and wherein the second message about which notification has been provided is delivered from the second message management service to the network device in accordance with the registered subscription.

Further features of the present description will be apparent from the following description of the example (with reference to the attached drawings).

BRIEF DESCRIPTION OF THE DRAWINGS

FIG. 5 is a message to be registered in a device information topic.

FIGS. 6A and 6B is a message to be registered in a Sub event information notification topic.

FIGS. 8A and 8B is a message to be registered in an action processing result topic.

DESCRIPTION OF THE EMBODIMENTS

Embodiment 1

[Entire Configuration of System]

Figure 1:
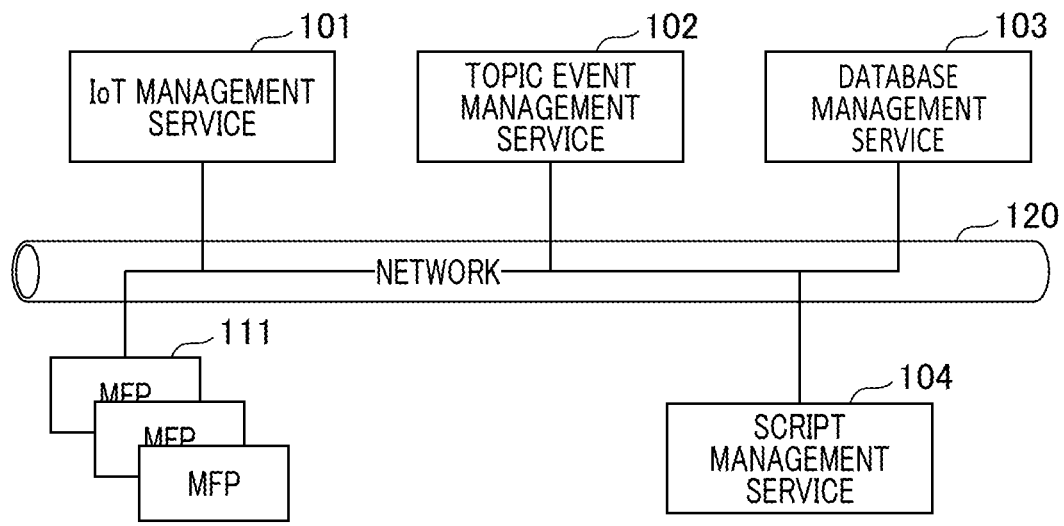
FIG. 1 illustrates an entire system configuration of a first embodiment.

FIG. 1 illustrates an entire system configuration of the first embodiment. An information processing system shown in FIG. 1 includes an IoT management service 101, a topic event management service 102, a database management service 103, a script management service 104, and an MFP 111. All elements from the IoT management service 101 to the MFP 111 are connected via a network 120. The network 120 is, for example, a LAN such as Internet, WAN, a telephone line, a dedicated digital line, and is a communication network realized by the combination of these. LAN is an abbreviation for "Local Area Network". Additionally, WAN is an abbreviation for "Wide Area Network".

For example, the IoT management service 101, the topic event management service 102, the database management service 103, and the script management service 104 assume a cloud service provided by Amazon Web Service, Inc. In contrast, the service in the present invention is not limited to the cloud service provided by Amazon Web Service, Inc. For example, all elements from the IoT management service 101 to the script management service 104 may be realized by cloud services such as Google Cloud Platform and Microsoft Azure.

The IoT management service 101 is a cloud service that provides various functions related to IoT. The IoT management service 101 assumes, for example, AWS IoT provided by Amazon Web Service, Inc. The topic event management service 102 manages information related to Pub and Sub events of a topic, which is a message management system provided by the IoT management service 101.

In the description below, "publish" defines, for example, that a network device serving as a publisher provides notification about a topic of a message with identification information (ID) indicating its predetermined operational information. Additionally, messages about which the topic has been notified are delivered to subscribers such as services realized by virtual machines and the like in accordance with preregistered subscriptions.

The topic event management service 102 assumes, for example, a Web service operating on Amazon EC 2, which is a virtual server on the cloud provided by Amazon Web Services, Inc. The database management service 103 is, for example, a database management service (information management service) having the NoSQL structure. The database management service 103 assumes, for example, Amazon Dynamo DB provided by Amazon Web Service, Inc. Additionally, although the database management service 103 is a database management service having the NoSQL structure, the structure of the database applicable to the present invention is not specifically limited. For example, the database management service 103 may be an RDS database management service and the like.

The script management service 104 is a service that manages a script that drives various events of the IoT management service 101 and the database management service 103 as triggers. For example, the script management service 104 is assumed to be AWS Lambda provided by Amazon Web Service, Inc.

The MFP 111 is a multifunctional device serving as an IoT client and has a function of publishing device information to the topic provided by the IoT management service 101. Additionally, a plurality of MFPs 111 may be present, and each MFP 111 can also connect to the IoT management service 101.

[Hardware Configuration]

Figure 2:
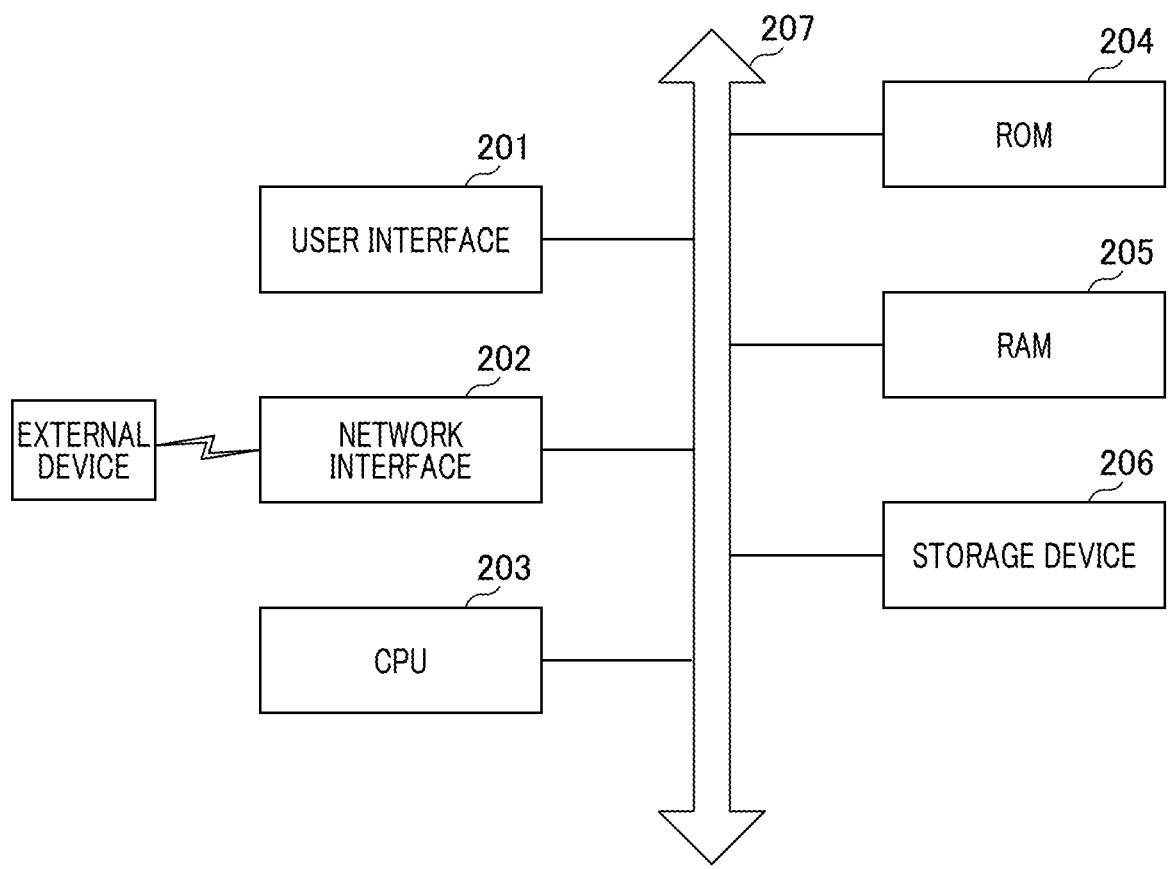
FIG. 2 illustrates an example of a hardware configuration of an entire system.

FIG. 2 illustrates an example of the hardware configuration of the IoT management service 101, the topic event management service 102, the database management service 103, the script management service 104, and the MFP 111.

The IoT management service 101 to the MFP 111 can apply a hardware configuration of general computer as shown in FIG. 2. The computer shown in FIG. 2 includes a user interface 201 and an input/output interface 207. The user interface 201 inputs and outputs information by using hardware such as a display, a keyboard, a mouse, and a touch panel. Computers that are not equipped with this hardware can also be connected and operated from another computer by remote desktop, remote shell, and the like. A network interface 202 connects to a network such as a LAN and communicates with another computer and a network device. The CPU 203 controls the entire computer. Specifically, the CPU 203 executes a program that has been read from the ROM 204, the RAM 205, a storage device 206, and the like. CPU is an abbreviation for "Central Processing Unit". ROM is an abbreviation for "Read Only Memory". RAM is an abbreviation for "Random Access Memory". In the ROM 204, embedded programs and data are recorded. The RAM 205 functions as a temporary memory region. The storage device 206 is storage unit such as an HDD. HDD is an abbreviation for "Hard Disk Drive". Each unit is connected with each other via an input/output interface 207.

[Software Configuration]

Figure 3:
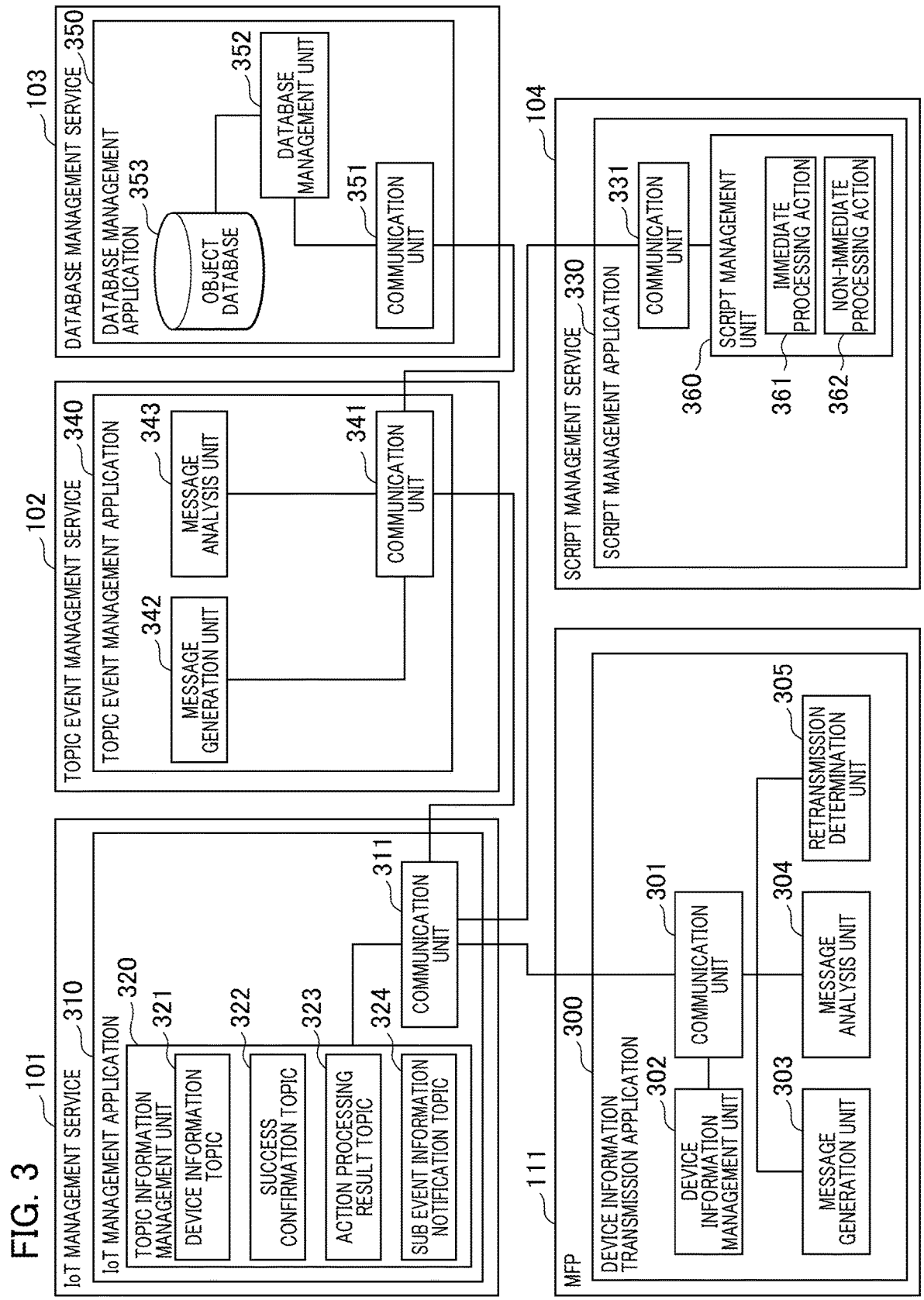
FIG. 3 illustrates a software configuration of the first embodiment.

FIG. 3 illustrates a software configuration of the first embodiment. The MFP 111 has a device information transmission application 300. The device information transmission application 300 is stored in the storage device 206 of the MFP 111 and is executed by the CPU 203. The device information transmission application 300 has a communication unit 301, a device information management unit 302, a message generation unit 303, a message analysis unit 304, and a retransmission determination unit 305.

The communication unit 301 communicates with an IoT management application 310 via the network interface 202. The device information management unit 302 manages error information generated in the MFP 111 and device information such as a configuration of the device. The message generation unit 303 generates a message to be published (pub) to a device information topic 321. At this time, the message generation unit 303 issues a unique message ID for each message, and includes the message ID in the Pub message. Moreover, the message generation unit 303 publishes a message to the device information topic 321 via the communication unit 301. Note that the message ID generated by the message generation unit 303 is stored in the RAM 205.

The message analysis unit 304 requests a success confirmation topic 322 to register the subscription via the communication unit 301, and starts a subscription (Sub). Additionally, the message analysis unit 304 analyzes the message received from the success confirmation topic 322 and acquires the message ID included in the message. The message analysis unit 304 collates the acquired message ID with the message ID generated by the message generation unit 303, and determines the success of the processing. The retransmission determination unit 305 determines the necessity of a retry of Pub. The retransmission determination unit 305 determines that a retry of Pub is necessary if a predetermined time has elapsed from the timing of Pub being performed without a success determination based on the message received from the success confirmation topic 322.

The IoT management service 101 has the IoT management application 310. The IoT management application 310 is stored in the storage device 206 of the IoT management service 101 and is executed by the CPU 203. The IoT management application 310 has a communication unit 311 and a topic information management unit 320.

The communication unit 311 communicates with the device information transmission application 300, a script management application 330, and a topic event management application 340 via the network interface 202. The topic information management unit 320 manages the topic, which is a registration destination of messages in Pub and Sub communication. The topic information management unit 320 manages the device information topic 321, the success confirmation topic 322, an action process result topic 323, and a Sub event information notification topic 324.

The topic information management unit 320 analyzes the Pub request received via the communication unit 311 and registers the message in the corresponding topic. Additionally, the topic information management unit 320 analyzes the Sub start request received via the communication unit 311, and establishes a connection with the client that has transmitted the request.

The device information topic 321 is a topic for registering the device information of the MFP 111 and functions as a first message management system that receives a message by using the network device (MFP 111) serving as a publisher. The success confirmation topic 322 functions as a second message management service for delivering a message indicating the success of the message processing by using the network device serving as a subscriber. That is, the success confirmation topic 322 is a topic by which the device information transmission application 300 confirms that the subscriber processing of the device information topic 321 has succeeded. The action processing result topic 323 is a topic for communicating the processing result of the subscriber of the device information topic 321 to the topic event management service 102. The Sub event information notification topic 324 is a topic in which Sub events of all the topics of the IoT management application 310 are registered.

The script management service 104 has the script management application 330. The script management application 330 is stored in the storage device 206 of the script management service 104 and executed by the CPU 203. The script management application 330 has a communication unit 331 and a script management unit 360.

The communication unit 331 communicates with the IoT management application 310 via the network interface 202. The script management unit 360 manages a script that is driven upon receipt of a Pub event of the topic of the IoT management application 310. The script management unit 360 manages an immediate processing action 361 and a non-immediate processing action 362.

While the immediate processing action 361 is in charge of a process of reporting to a person involved if there is an error code in the message, the non-immediate processing action 362 performs a process of storing the message in, for example, a storage environment without processing the message. The immediate processing action 361 is a script that is driven in response to the Pub of the device information topic 321 being performed. The immediate processing action 361 starts a Sub for the device information topic 321 and receives a message that has been published. Additionally, the immediate processing action 361 analyzes the received message and performs a process such as error notification if it has been determined that it is necessary to take immediate action, for example, a case in which an error code is included. Subsequently, the immediate processing action 361 generates the result of the script processing as a Pub message and publishes it to the action processing result topic 323.

The non-immediate processing action 362 is a script that is driven in response to a Pub of the device information topic 321 being performed. The non-immediate processing action 362 starts a Sub to the device information topic 321 and receives a message that has been published. Unlike the immediate processing action 361, the non-immediate processing action 362 does not analyze the message and stores the received message in, for example, a storage environment. Subsequently, the non-immediate processing action 362 generates the result of the script processing to serve as a Pub message and publishes it to the action processing result topic 323.

The topic event management service 102 includes the topic event management application 340. The topic event management application 340 is stored in the storage device 206 of the topic event management service 102 and is executed by the CPU 203. The topic event management application 340 has a communication unit 341, a message generation unit 342, and a message analysis unit 343.

The communication unit 341 communicates with the IoT management application 310 and a database management application 350 via the network interface 202. The message generation unit 342 generates a message to be published to the success confirmation topic 322. Additionally, the message generation unit 303 publishes a message to the success confirmation topic 322 via the communication unit 311.

The message analysis unit 343 starts Sub between the Sub event information notification topic 324 and the action processing result topic 323 via the communication unit 341. The message analysis unit 343 analyzes the message received from the Sub event information notification topic 324 via the communication unit 341 and detects that the immediate processing action 361 and the non-immediate processing action 362 have started a Sub. At this time, the message analysis unit 343 requests the database management application 350 to register the action information via the communication unit 341. Additionally, the message analysis unit 343 analyzes the message received from the action processing result topic 323 via the communication unit 341, and detects that the processing of the action linked to the specific message ID has been completed. At this time, the message analysis unit 343 requests the database management application 350 to register message management information (message information) via the communication unit 341.

Additionally, the message analysis unit 343 makes a request to the database management application 350 for the processing state of action linked to the specific message ID via the communication unit 341. The message analysis unit 343 receives the processing state of the action linked to the specific message ID via the communication unit 341, and upon determining that all the actions have been completed, the message analysis unit 343 requests the message generation unit 342 to perform Pub.

The database management application 350 is stored in the storage device 206 of the database management service 103 and executed by the CPU 203. The database management application 350 has a communication unit 351, a database management unit 352, and an object database 353. The communication unit 351 communicates with the topic event management application 340 via the network interface 202. The database management unit 352 manages the object database 353. The database management unit 352 receives the update request and the acquisition request of the table information of the object database 353 via the communication unit 351. Upon receipt of a request via the communication unit 351, the database management unit 352 performs a table information update operation and the data acquisition processing on the object database 353, and returns the processing result via the communication unit 351.

The object database 353 is a NoSQL database. The object database 353 has an action information table that manages the processing result of the script of the script management unit 360 and a message information table that manages message information of the device information topic 321. An example of the action information table is shown in Table 1.

TABLE 1

Action information table

| Action Id | Topic |
| --- | --- |
| Action A | Device A/Toner |
| Action B | Device A/Drum |
| Action C | Device C/Device Info |

The action Id column is a column that stores values for uniquely identifying each script of the script management unit 360. The topic column is a column that stores a key of the registration destination topic in which the script corresponding to the action Id performs Sub. An example of the message information table is shown in Table 2.

TABLE 2

Message information table

| Message Id | Topic | Action Id | Result |
| --- | --- | --- | --- |
| MESSAGE 001 | Device A/Toner | Action A | Error |
| MESSAGE 002 | Device A/Drum | Action B | Success |
| MESSAGE 003 | Device C/Device Info | Action C | Unnecessary |
| MESSAGE 003 | Device C/Device Info | Action C | |

The message Id column is a column that stores values that uniquely identify each message. The topic column is a column that stores the registration destination of the topic corresponding to the message Id. The action Id column is a column that stores a value that uniquely identifies the script of the script management unit 360 that performs the process linked to the message Id. The result column is a column that stores a value indicating the processing result of the script corresponding to the action Id. "success" indicates the success of a process, "error" indicates the failure of a process, "unnecessary" indicates a state in which the result can be ignored, and blank indicates an initial state.

[Processing Sequence]

Figure 4:
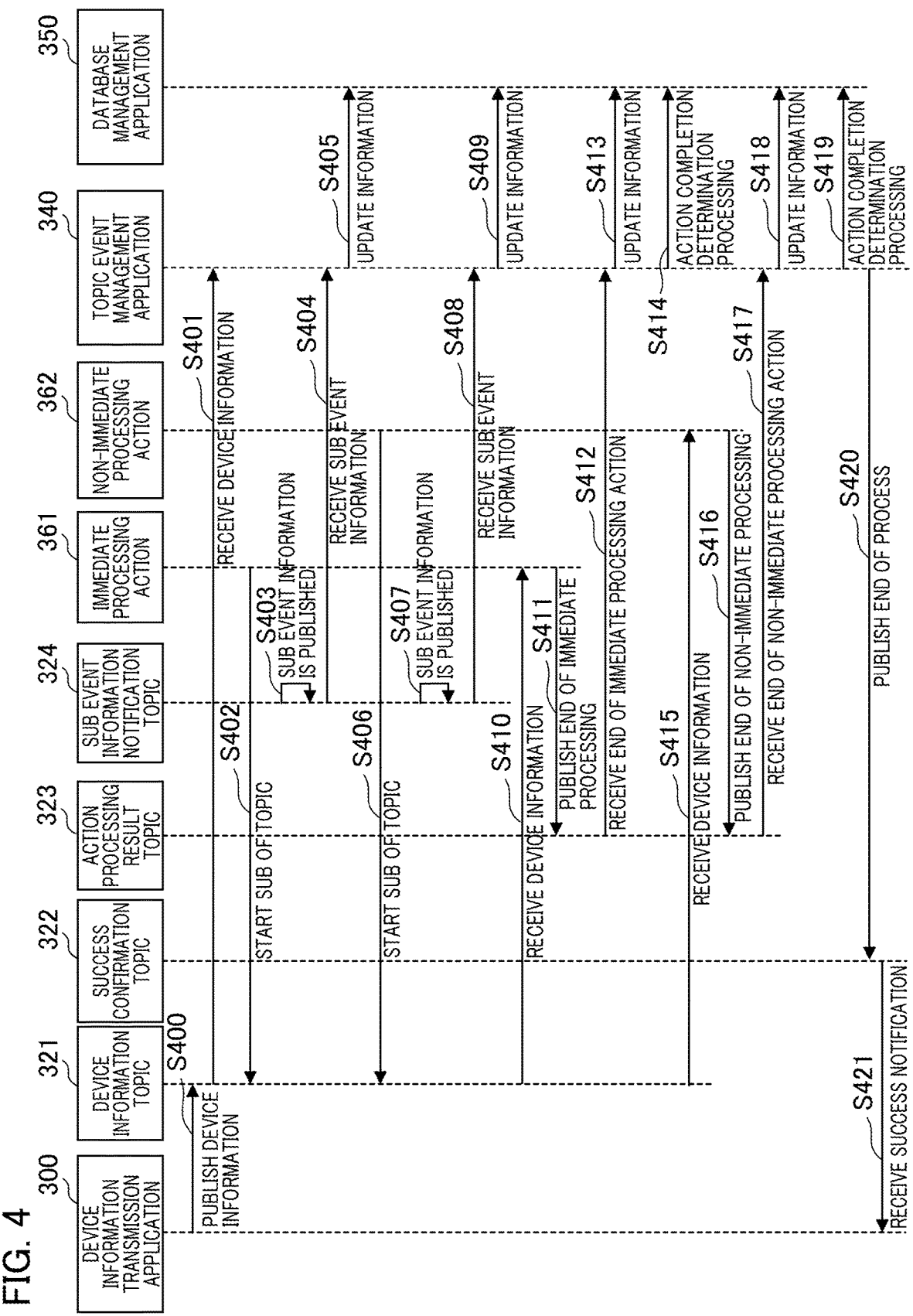
FIG. 4 illustrates a processing sequence of the entire system of the first embodiment.

FIG. 4 illustrates a processing sequence of the entire system of the first embodiment. The processing sequence in FIG. 4 is a processing sequence from when an empty error of the toner cartridge of the MFP 111 has occurred to the MFP 111 detecting that processing for the error has been completed. It is assumed that the Sub of the message from the success confirmation topic 322 by the device information transmission application 300 and the Sub of the message from the device information topic 321 by the topic event management application 340 have started.

In step S400, the device information management unit 302 of the device information transmission application 300 detects an empty error of the toner cartridge, and the message generation unit 303 generates a Pub message of error information. Subsequently, the communication unit 301 publishes the Pub message generated by the message generation unit 303 to the device information topic 321. Additionally, at the same time as the Pub of the message is being performed, the retransmission determination unit 305 starts time counting for determining a retry of the Pub. The message that has been published is registered in the device information topic 321 by the topic information management unit 320 of the IoT management application 310. The contents of the message to be registered will be described with reference to FIG. 5.

FIG. 5 illustrates an example of a message to be registered in the device information topic 321. The message 500 is formed in the json format. The "message Id" column is an ID that uniquely identifies the message 500, in which "MESSAGE 001" that is an ID issued by the message generation unit 303 is described. The "topics" column is a value indicating the registration destination of the message, in which "Device A/Device Info" indicating the device information topic of the MFP 111 is described. The "event Type" column is an event type of the message, in which a value indicating a cartridge error is described. The "error Code" column is an ID that uniquely identifies an error, in which a value indicating an empty error of the cartridge is described.

The description will return to FIG. 4. In step S401, the message analysis unit 343 of the topic event management application 340 receives the message 500 from the device information topic 321 via the communication unit 341. Subsequently, in step S402, the script management application 330 is notified that the message has been registered in the device information topic 321 in step S400. The script management unit 360 of the script management application 330 drives the immediate processing action 361 and the non-immediate processing action 362. Subsequently, the immediate processing action 361 makes a Sub start request to the device information topic 321 to start the reception of the message from the device information topic 321.

In step S403, in response to the start of a Sub by the immediate processing action 361 in step S402, the topic information management unit 320 registers that the immediate processing action 361 has started a Sub in the Sub event information notification topic 324 as a message. The contents of this message will be explained with reference to FIGS. 6A and 6B.

FIGS. 6A and 6B illustrates an example of a message to be registered in the Sub event information notification topic 324. The message 600 in FIG. 6A shows a Sub start event of the immediate processing action 361, and is formed in the json format. The "client Id" column is an ID that uniquely specifies the client that has started Sub. Note that, in this example, it is assumed that the Client Id of the immediate processing action 361 is "Immediate action", and the Client Id of the non-immediate processing action 362 is "Store action". The "Client Id" of the message 600 is an "Immediate action" indicating the immediate processing action 361. The "time Stamp" column indicates the event occurrence time. The "event Type" column indicates the type of event, in which "subscribed" indicating the start of the Sub is described. The "topics" column is a value indicating the registration destination where the event has occurred, in which "Device A/Device Info" indicating the device information topic of the MFP 111 is described.

The message 601 in FIG. 6B shows a Sub start event of the non-immediate processing action 361, and is formed in the json format. The "client Id" column in the message 601 is a "Store Action" indicating the non-immediate processing action 362. Since the other elements conform to the message 600, the detailed explanation will be omitted.

The description will return to FIG. 4. In step S404, the message analysis unit 343 of the topic event management application 340 receives the message 600 from the Sub event information notification topic 324 via the communication unit 341. By analyzing the received message 600, the message analysis unit 343 detects, based on the device information topic 321, that the immediate processing action 361 has started Sub.

In step S405, the message analysis unit 343 transmits a notification that the immediate processing action 361 has started processing to the database management application 350 via the communication unit 341, and requests the update of information. The database management unit 352 of the database management application 350 receives the update request via the communication unit 351. The database management unit 352 updates the action information table and the message information table of the object database 353 in accordance with the received update request. Table 3 shows the action information table when the processing in step S405 in the first embodiment has been completed.

TABLE 3

Action information table at the start of immediate processing Action Processing

| Action Id | Topic |
| --- | --- |
| Immediate Action | Device A/Device Info |

In the action Id column, "Immediate action" that is the action Id of the immediate processing action 361 is stored. In the topic column, "Device A/Device Info" indicating the device information topic 321 that is a topic in which the immediate processing action has started Sub is stored. Table 4 shows the message information table when the process in step S405 in the first embodiment has been completed.

TABLE 4

Message information table at the start of immediate processing Action processing

| Message Id | Topic | Action Id | Result |
| --- | --- | --- | --- |
| MESSAGE 001 | Device A/Device Info | Immediate Action | |

In the message Id column, "MESSAGE 001", which is a message Id corresponding to the processing result, is stored. In the topic column, "Device A/Device Info", which is a registration destination of the topic corresponding to the message Id, is stored. In the action Id column, "Immediate action", which is the action Id of the immediate processing action 361, is stored. The "result" column is blank because it is in the initial process state. Note that if the action is not an important action in the use case, at this point, the "result" column is set to the value of "Unnecessary". Also note that since the immediate processing action 361 and the non-immediate processing action 362 are important actions in the use case, the "result" column is not set to the value of "Unnecessary".

The description will return to FIG. 4. In step S406, the non-immediate processing action 362 makes a Sub start request to the device information topic 321. Accordingly, the reception of the message from the device information topic 321 starts. In step S406, in response to the fact that the non-immediate processing action 362 has started a Sub, in step S407, the topic information management unit 320 registers the fact in the Sub event information notification topic 324 as a message. The message to be registered is the message 601 in FIG. 6B.

In step S408, the message analysis unit 343 of the topic event management application 340 receives the message 601 from the device information topic 321 via the communication unit 341. By analyzing the received message 601, the message analysis unit 343 detects that the non-immediate processing action 362 has started a Sub from the device information topic 321.

In step S409, the message analysis unit 343 transmits that the non-immediate processing action 362 has started processing as an action information update request to the database management application 350 via the communication unit 341. The database management unit 352 of the database management application 350 receives the action information update request via the communication unit 351. Subsequently, the database management unit 352 updates the action information table of the object database 353 in accordance with the action information update request. Table 5 shows the action information table when the process in step S409 in the first embodiment has been completed.

TABLE 5

Action information table at the start of non-immediate processing Action Processing

| Action ID | Topic |
| --- | --- |
| Immediate Action | Device A/Device Info |
| Store Action | Device A/Device Info |

"Store action", which is an action Id of the non-immediate processing action 362, is stored in the action Id column. "Device A/Device Info" indicating the device information topic 321, which is the topic in which the non-immediate processing action 362 has started a Sub, is stored in the topic column. Specifically, at the time that the processing of step S409 has been completed, the immediate processing action 361 and the non-immediate processing action 362 serving as the subscriber of the device information topic 321 are registered in the action information table. Table 6 shows the message information table when the process in step S409 in the first embodiment has been completed.

TABLE 6

Message information table at the start of non-
immediate processing Action processing

| Message Id | Topic | Action Id | Result |
|---|---|---|---|
| MESSAGE 001 | Device A/Device Info | Immediate Action | |
| MESSAGE 001 | Device A/Devic eInfo | Store Action | |

"MESSAGE 001", which is a message Id corresponding to the processing result, is stored in the "message Id" column. "Device A/Device Info", which is the registration destination of the topic corresponding to the "message Id" column, is stored in the "topic column". "Store action", which is the action Id of the non-immediate processing action 362, is stored in the "action Id" column. The "result" column is blank because it is in the initial process state.

The description will return to FIG. 4. In step S410, the immediate processing action 361 receives the message 500 (first message) from the device information topic 321. The immediate processing action 361 analyzes the received message 500, determines whether or not immediate processing is required, and performs predetermined processing. For example, the immediate processing action 361 performs a process that provides e-mail notification processing to the concerned person upon receipt of an empty error of the toner cartridge. The determination of immediate processing and the contents of the processing are not specifically limited.

In step S411, the immediate processing action 361 generates the processing result as a Pub message and publishes it to the action processing result topic 323. The published message is registered in the action processing result topic 323 by the topic information management unit 320 of the IoT management application 310. That is, the action processing result topic 323 functions as a third message management service that performs the processes below. The action processing result topic 323 receives a message corresponding to the processing result of the first message (message 500) in the immediate processing action 361 serving as a publisher. The contents of the message to be registered in the action processing result topic 323 will be described with reference to FIGS. 8A and 8B. Note that, in step S411, it is assumed that the immediate processing action 361 has published that the process has succeeded.

FIGS. 8A and 8B illustrates an example of a message to be registered in the action processing result topic 323. The message 800 in FIG. 8A is formed in the json format. The "Client Id" is an ID that uniquely identifies the action. The "Client Id" of the message 600 is "Immediate action" indicating the non-immediate processing action 362. "topics" is a key indicating a registration destination where a message has been received in performing the processing by the action. The "Device A/Device Info", indicating the device information topic of the MFP 111, is described in "topics" column. "result" column shows a value indicating the processing result. The "message Id" is an ID that uniquely identifies the message 500. The "message Id" of the message 500 is directly copied to the "result" column.

The message 801 in FIG. 8B shows the Sub start event of the non-immediate processing action 361 and is formed in the json format. The "Client Id" of the message 601 is "Store action" indicating the non-immediate processing action 362. Since the other elements conform to the message 800, the detailed explanation will be omitted.

The description will return to FIG. 4. In step S412, the message analysis unit 343 of the topic event management application 340 receives the message 800 from the action processing result topic 323. The message analysis unit 343 analyzes the received message 800 and detects that the immediate processing action 361 has succeeded in the processing linked to MESSAGE 001.

In step S413, the message analysis unit 343 requests the database management application 350 to update the data in accordance with the analysis result in step S412. The database management unit 352 of the database management application 350 updates the object database 353 upon receipt of the update request. The completion of the processing linked to MESSAGE 001 of the immediate processing action 361 is reflected on the message information table. Specifically, the topic event management application 340 functions as a first registration means that performs the processing below, in response to the completion of the processing in the first service (immediate processing action 361) of the first message that has been delivered from the device information topic 321. The topic event management application 340 registers the processing result of the first message in the immediate processing action 361 in the database management service 103. Table 7 shows the message information table when the process in step S413 in the first embodiment has been completed.

TABLE 7

Message information table at the completion of
immediate processing Action processing

| MessageId | Topic | ActionId | Result |
|---|---|---|---|
| MESSAGE001 | DeviceA/DeviceInfo | ImmediateAction | Success |
| MESSAGE001 | DeviceA/DeviceInfo | StoreAction | |

In Table 7, the processing result of the Result column of the first row is updated from blank to "Success". Other elements are similar to those in Table 6, so the detailed description thereof will be omitted. In step S414, the topic event management application 340 confirms the processing state of the immediate processing action 361 and the non-immediate processing action 362 and determines the completion of the processing thereof. This processing will be described with reference to the flowchart in FIG. 7.

Figure 7:
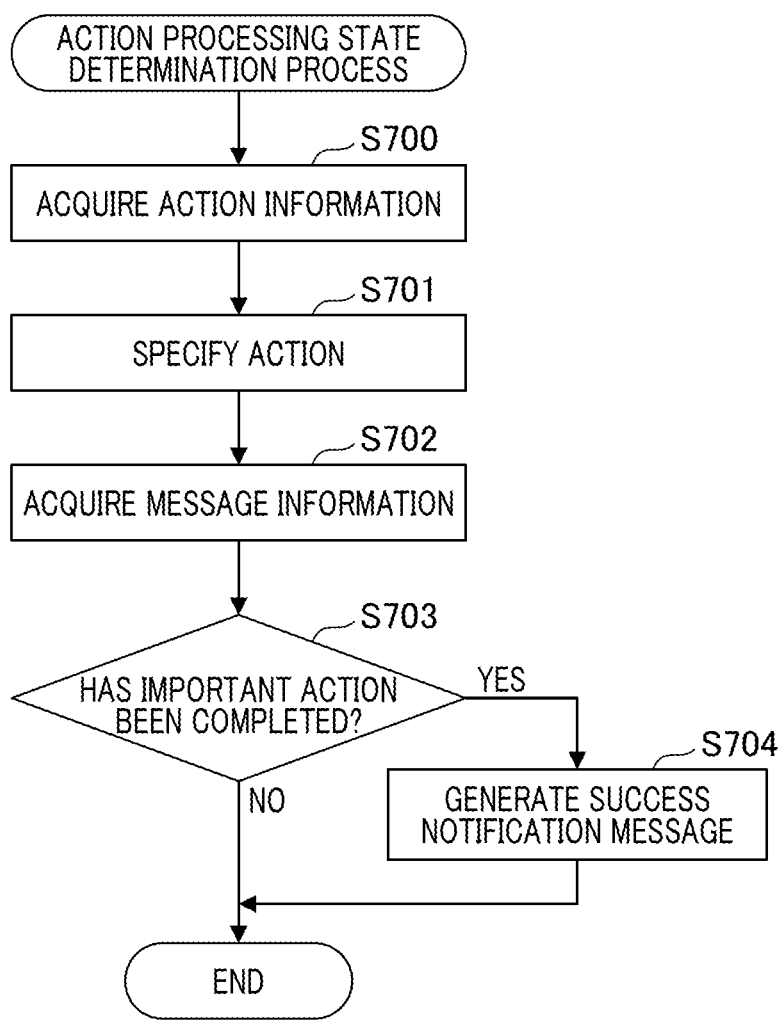
FIG. 7 illustrates an example of a process that determines an action processing state.

FIG. 7 is a flowchart that illustrates an example of the determination processing of the action processing state introduced by the topic event management application 340. In step S700, the topic event management application 340 acquires action information from the database management application 350 via the communication unit 341. The topic event management application 340 acquires the action information shown in Table 3.

In step S701, the message analysis unit 343 refers to the action information that has been acquired in step S700 and specifies the action serving as the subscriber of the device information topic 321. It is specified that the subscriber of the device information topic 321 is the immediate processing action 361 and the non-immediate processing action 362.

In step S702, the message analysis unit 343 acquires the message information from the database management application 350 via the communication unit 341. The message information to be acquired is limited to the action that has been specified in step S701. The message information of the immediate processing action 361 and the non-immediate processing action 362 is acquired.

In step S703, the message analysis unit 343 refers to the message information that has been acquired in step S702 and determines whether or not a predetermined important action has been completed among the processes of action that have been specified in step S701. Specifically, the message analysis unit 343 performs determination with reference to the "result" column of the message information. If there is a blank value in the "result" column or no element is found, the message analysis unit 343 determines that an important action has not been completed yet, and ends the process. If there is no blank value in the "result" column, the message analysis unit 343 determines that an important action has been completed, and the process proceeds to step S704. In step S704, the message generation unit 342 of the topic event management application 340 generates a Pub message indicating that the processing of the important action has succeeded.

The description will return to FIG. 4. At the time the processing in step S414 has been completed, the message information is as shown in Table 7, and since the "result" column of the non-immediate processing action 362 is blank, it is determined that the important action has not been completed. In step S415, the non-immediate processing action 362 receives the message 500 from the device information topic 321. Although the non-immediate processing action 362 transmits the received message 500 to, for example, AmazonS3 or the Amazon Kinesis stream to perform a process that is stored in the message, the contents of the processing are not particularly limited.

In step S416, the non-immediate processing action 362 generates the processing result as a Pub message and publishes it to the action processing result topic 323. Specifically, the action processing result topic 323 receives a message corresponding to the processing result in the non-immediate processing action 362 of the first message, in which the non-immediate processing action 362 serves as the publisher. Specifically, the published message is registered in the action processing result topic 323 by the topic information management unit 320 of the IoT management application 310. Note that in step S416, it is assumed that the non-immediate processing action 362 has published a message indicating that the processing has succeeded, and the message registered in the action processing result topic 323 is a message 801.

In step S417, the message analysis unit 343 of the topic event management application 340 receives the message 801 from the action processing result topic 323. The message analysis unit 343 analyzes the received message 801 and detects that the non-immediate processing action 361 has succeeded in the processing linked to MESSAGE 001. Additionally, the message analysis unit 343 detects that the non-immediate processing action 362 has succeeded in the processing linked to MESSAGE 001 by analyzing the message 801.

In step S418, the message analysis unit 343 requests the database management application 350 to update the data in accordance with the result that has been analyzed in step S416. The database management unit 352 of the database management application 350 updates the object database 353 upon receipt of the update request. The completion of the processing linked to MESSAGE 001 of the non-immediate processing action 362 is reflected on the message information table. Specifically, the topic event management application 340 functions as a second registration means that performs the processing below in response to the completion of the processing in the second service (non-immediate processing action 362) of the first message delivered by the device information topic 321. The topic event management application 340 registers the processing result of the first message in the non-immediate processing action 362 in the database management service 103. Table 8 shows a message information table when the processing in step S418 in the first embodiment has been completed.

TABLE 8

Message information table at the completion of non-immediate processing Action proccessing

| Message Id | Topic | Action Id | Result |
| --- | --- | --- | --- |
| MESSAGE 001 | Device A/Device Info | Immediate Action | Success |
| MESSAGE 001 | Device A/Device Info | Store Action | Success |

In the message information table shown in Table 8, the processing result of the "result" column of the second row is updated from blank to "Success".

In step S419, similar to step S414, the process of the flowchart in FIG. 7 is executed. That is, the topic event management application 340 executes the determination processing of the processing state of the immediate processing action 361 and the non-immediate processing action 362. At the time the process in step S419 has been completed, the message information is as shown in Table 8, and no action in which the "result" column is blank is present. Hence, it is determined that an important action has been completed. As a result, the message generation unit 342 generates a Pub message indicating that the processing of the important action has succeeded. In this example, if all processing results in the subscriber of the device information topic 321 indicate success, a Pub message indicating that the processing of the important action has succeeded is generated. As a matter of course, if processing at a predetermined part of the subscriber of the device information topic 321 has succeeded, a Pub message indicating that the processing of the important action has succeeded may be generated.

In step S420, the message generation unit 342 publishes the Pub message that has been generated in step S419 to the success confirmation topic 322 via the communication unit 341. The published messaged is registered in the success confirmation topic 322 by the topic information management unit 320 of the IoT management application 310. That is, the topic event management application 340 functions as a delivery means that performs the processing below in accordance with the processing result of the first message. The topic event management application 340 delivers the second message indicating the success of the processing of the first message to the success confirmation topic 322. The second message to be registered in the success confirmation topic 322 will be described with reference to FIG. 9.

Figures 9, 10:
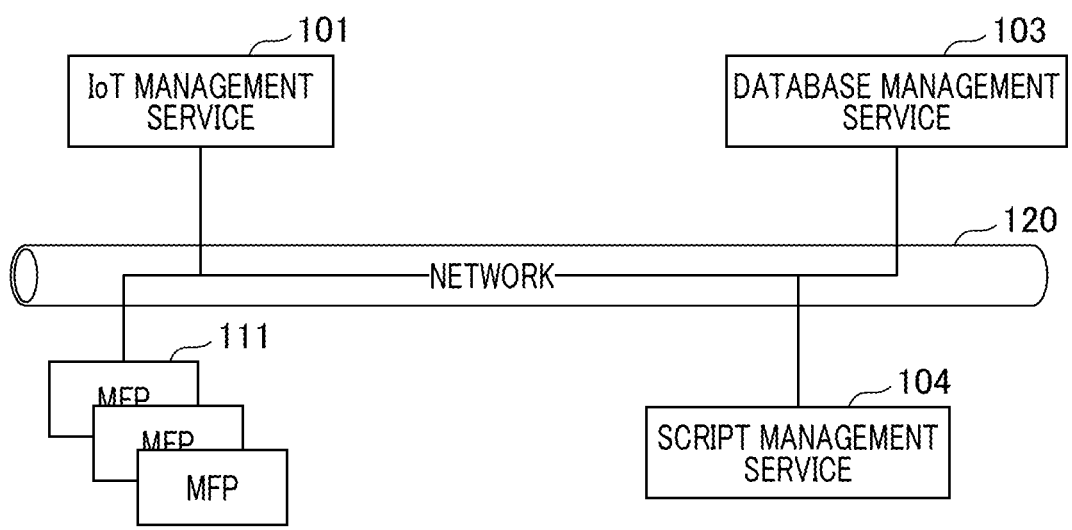
FIG. 9 is an example of a message to be registered in the success confirmation topic.
FIG. 10 illustrates an entire system configuration of a second embodiment.

FIG. 9 illustrates an example of a message to be registered in the success confirmation topic 322. The message 900 is formed in the json format. In "message Id" column, "MESSAGE 001" indicating the message 500 in FIG. 5 is described. The "result" column shows a value indicating the processing result. In the example shown in FIG. 9, "success", which indicates that all the processing of the message 500 in the action serving as the subscriber has succeeded, is described in the "result" column.

The description will return to FIG. 4. In step S421, the message generation unit 304 of the device management application 300 receives the message 900 delivered from the success confirmation topic 322 via the communication unit 301. By analyzing the received message 900, the message analysis unit 343 determines that all the actions related to "MESSAGE 001", which is a message ID issued in step S400, have been successfully completed. Since all the actions related to "MESSAGE 001" have been successfully completed, the retransmission determination unit 305 ends the count-up of the time count started in step S400. As a result, the device management application 300 determines that it is unnecessary to execute step S400 again. It is assumed that the processes from steps S400 to S421 has not passed the predetermined time of a retry. If the predetermined time of a retry has passed in the middle of the processes from steps S400 to S421, the process in step S400 is executed again.

According to the information processing system in the first embodiment, even if there are a plurality of subscribers in the topic to which one publisher transmits a message, it is possible to appropriately deliver the message to a plurality of subscribers while securing loose coupling. Furthermore, according to the present invention, even in a case in which the messages for which notification has been provided by the MFP 111 serving as a publisher that performs the retransmission determination is processed by a plurality of services, the registration destinations of the subscriber for the retransmission determination can be aggregated, as in the above-described success confirmation topic 322.

Embodiment 2

The information processing system of the second embodiment does not operate the topic event management service 102 serving as a Web service to reduce the operation cost. FIG. 10 illustrates the entire system configuration of the second embodiment. The IoT management service 101, the database management service 103, the script management service 104, and the MFP 111 are connected with each other via the network 120. The other elements are similar to those in FIG. 1, so the detailed description thereof will be omitted.

Figure 11:
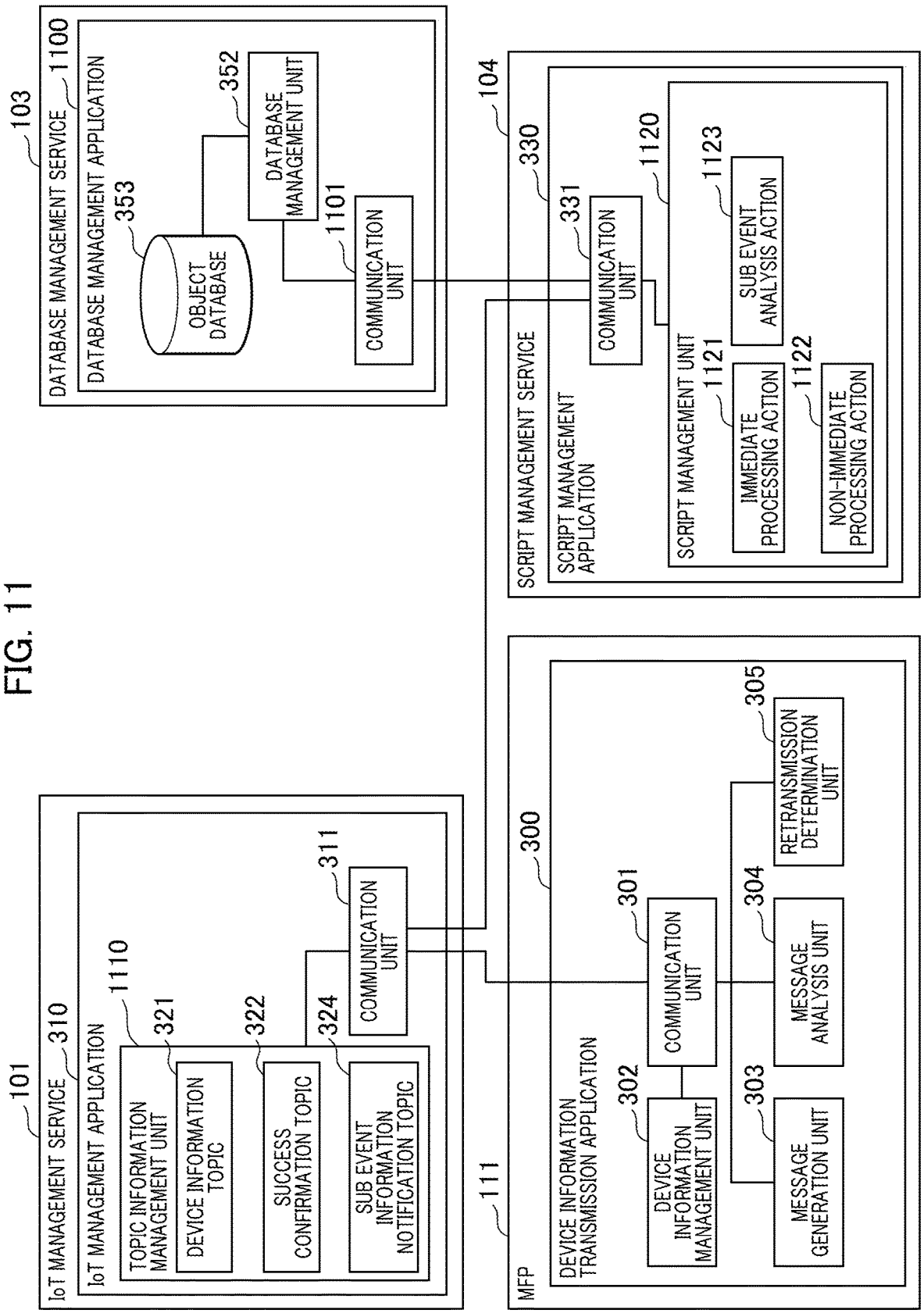
FIG. 11 illustrates a software configuration of the second embodiment.

FIG. 11 illustrates a software configuration of the second embodiment. Elements similar to those of the system described with reference to FIG. 3 are denoted by the same reference numerals, and the detailed description thereof will be omitted.

A database management application 1100 is stored in the storage device 206 of the database management service 103, and executed by the CPU 203. The database management application 1100 has a communication unit 1101, the database management unit 352, and the object database 353. The communication unit 1101 communicates with the script management application 330 via the network interface 202.

A topic information management unit 1110 of the IoT management application 310 has the device information topic 321, the success confirmation topic 322, and the Sub event information notification topic 324.

A script management unit 1120 of the script management application 330 manages an immediate processing action 1121, a non-immediate processing action 1122, and a Sub event analysis action 1123. In addition to the function of the immediate processing action 361 in FIG. 3, the immediate processing action 1121 can perform the determination processing of the action processing state described with reference to FIG. 7. In addition to the function of the non-immediate processing action 362 in FIG. 3, the non-immediate processing action 1122 can also perform the determination processing of the action processing state described with reference to FIG. 7.

The Sub event analysis action 1123 is a script that is driven in response to a Pub being performed to the Sub event information notification topic 324. The Sub Event analysis action 1123 starts a Sub to the Sub event information notification topic 324 and receives the published message. The Sub event analysis action 1123 analyzes the received message and detects that the immediate processing action 1121 and the non-immediate processing action 1122 have started a Sub. Subsequently, the Sub event analysis action 1123 requests the database management application 1100 to register the action information.

Figure 12:
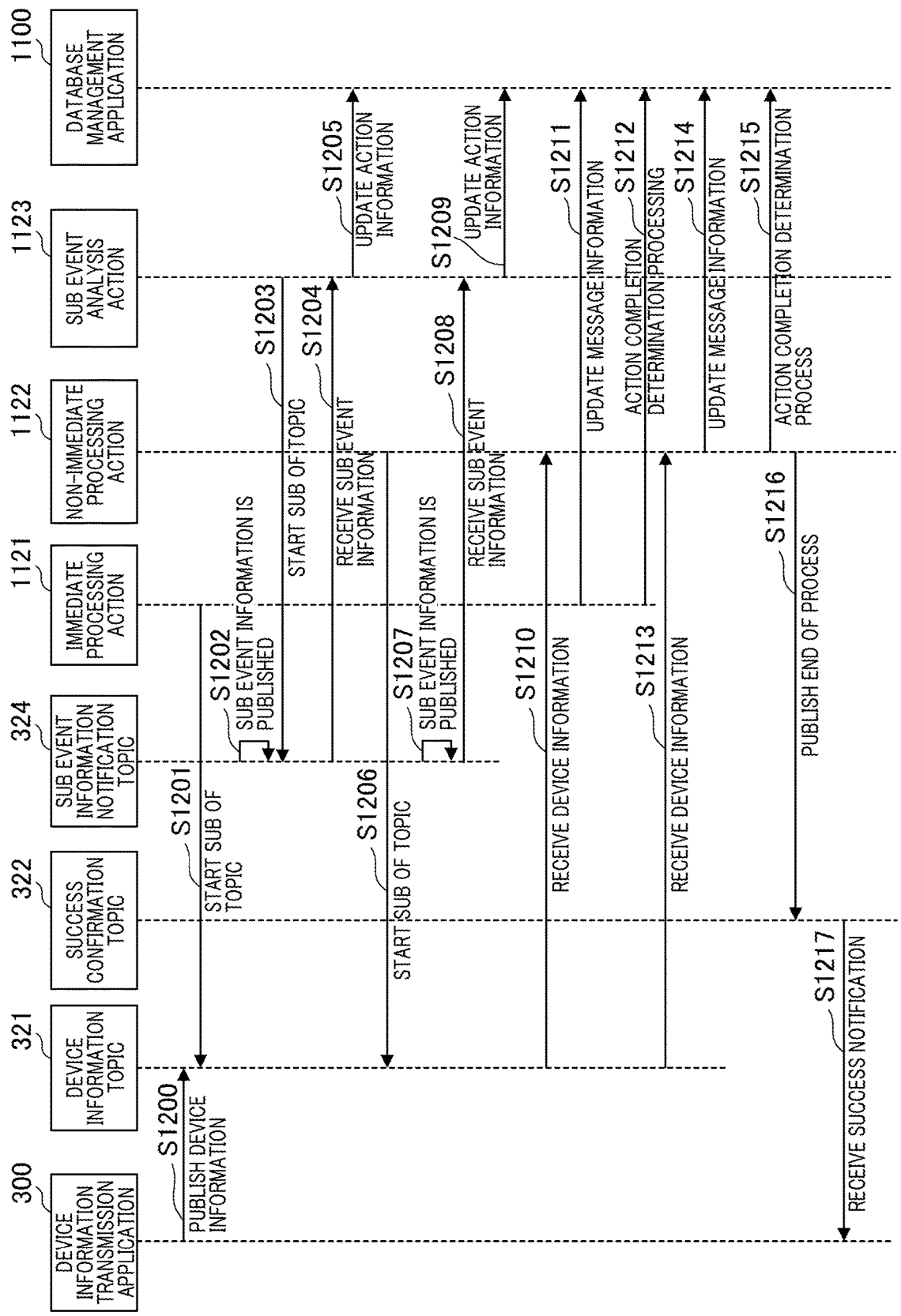
FIG. 12 illustrates a processing sequence of the entire system of the second embodiment.

FIG. 12 illustrates a processing sequence of the entire system in the second embodiment. As the premise of the processing sequence in FIG. 12, it is assumed that the Sub of the message from the success confirmation topic 322 by the device information transmission application 300 starts. Since the process in step S1200 is similar to that in step S400 in FIG. 4, the detailed description thereof will be omitted. Additionally, since the processes from steps S1201 to S1202 are similar to those from steps S402 to S403 in FIG. 4, the detailed description will be omitted.

In step S1203, the script management application 330 is notified about the fact that the message has been registered in the Sub event information notification topic 324 in step S1202. In response to this notification, the script management unit 1120 of the script management application 330 drives the Sub event analysis action 1123. The Sub event analysis action 1123 issues a Sub start request to the Sub event information notification topic 324 and starts receiving the message from the Sub event information notification topic 324. In step S1204, the Sub event analysis action 1123 receives the message 600 from the Sub event information notification topic 324. The Sub event analysis action 1123 analyzes the message 600 that has been received to detect that the immediate processing action 1121 has started a Sub from the device information topic 321.

In step S1205, the Sub event analysis action 1123 requests the update of information by transmitting a message indicating that the immediate processing action 1121 has started processing to the database management application 350. The database management unit 352 of the database management application 350 receives the update request of information via the communication unit 351 and updates the action information table of the object database 353. The state of the action information table when the process in step S1205 has been completed is as shown in Table 3.

Since the processes from steps S1206 to S1207 are similar to those from steps S406 to S407 in FIG. 4, the detailed description thereof will be omitted. In step S1208, the Sub event analysis action 1123 receives the message 601 from the Sub event information notification topic 324. By analyzing the message 601 that has been received, the Sub event analysis action 1123 detects that the non-immediate processing action 1122 has started a Sub from the device information topic 321.

In step S1209, the Sub event analysis action 1123 requests the update of information by transmitting a message indicating that the non-immediate processing action 1122 has started processing to the database management application 350. The database management unit 352 of the database management application 350 receives the information update request via the communication unit 351 and updates the action information table of the object database 353. The state of the action information table when the processing of step S1209 has been completed is as shown in Table 5.

Since the process in step S1210 is similar to that in step S410 in FIG. 4, the detailed description thereof will be omitted. In step S1211, the immediate processing action 1121 requests the update of information by transmitting the processing result to the database management application 350. The database management unit 352 of the database management application 350 receives the update request of information via the communication unit 351 and updates the message information table of the object database 353. That is, the immediate processing action 1121 itself serving as the first registration means registers the processing result of the immediate processing action 1121 in the database management service 103. Table 9 shows the message information table when the process in step S1211 has been completed

TABLE 9

Message information table at the completion of immediate processing Action processing in Embodiment 2

| Message Id | Topic | Action Id | Result |
|---|---|---|---|
| MESSAGE 001 | Device A/Device Info | Immediate Action | Success |

In step S1212, the immediate processing action 1121 executes the determination processing of the action processing state described with reference to FIG. 7. At the time of the processing in step S1212, the message information is as shown in Table 9. Information about non-immediate processing action is not registered. Hence, it is determined that the important action has not been completed in the determination processing of the action processing state. Since the process in step S1213 is similar to that in step S415 in FIG. 4, the detailed description will be omitted.

In step S1214, the non-immediate processing action 1122 transmits the processing result to the database management application 350 to request the update of information. The database management unit 352 of the database management application 350 receives the update request of information via the communication unit 351 and updates the message information table of the object database 353. Specifically, the non-immediate processing action 1122 itself serving as the second registration means registers the processing result in the non-immediate processing action 1122 in the database management service 103. The state of the message information table when the process in step S1214 has been completed is as shown in Table 8.

In step S1215, the non-immediate processing action 1122 executes the determination processing of the action processing state described with reference to FIG. 7. At the time of the process in step S1215, the message information is as shown in Table 8. Since no action in which the "result" column is blank is present, it is determined that the important action has been completed. Hence, the non-immediate processing action 1122 generates a Pub message indicating that the processing of the important action has succeeded. In step S1216, the message generation unit 342 of the topic event management application 340 publishes the Pub message generated in step S1215 to the success confirmation topic 322 via the communication unit 341. Since the process in step S1217 is similar to that in step S421 in FIG. 4, the description will be omitted. According to the information processing system in the second embodiment, it is possible to obtain an effect similar to the information processing system in the first embodiment without operating the topic event management service 102.

Embodiment 3

The information processing system of the third embodiment obtains an effect similar to that in the first embodiment, without operating the topic event management service 102 and the database management service 103.

Figure 13:
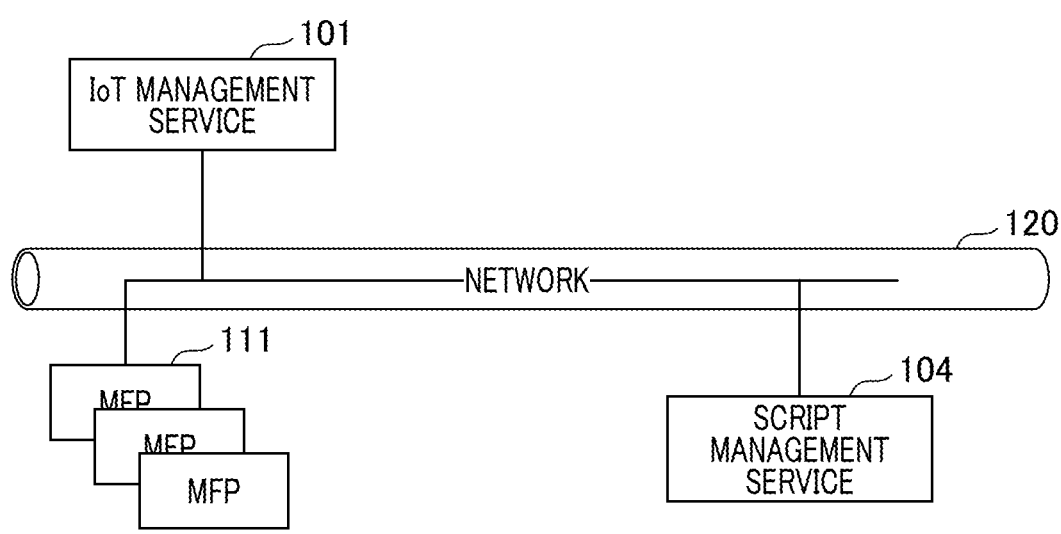
FIG. 13 illustrates an entire system configuration of a third embodiment.

FIG. 13 illustrates the entire system configuration in the third embodiment. The IoT management service 101, the script management service 104, and the MFP 111 are connected with each other via a network 120. The other elements are similar to those in FIG. 1, so the detailed description thereof will be omitted.

Figure 14:
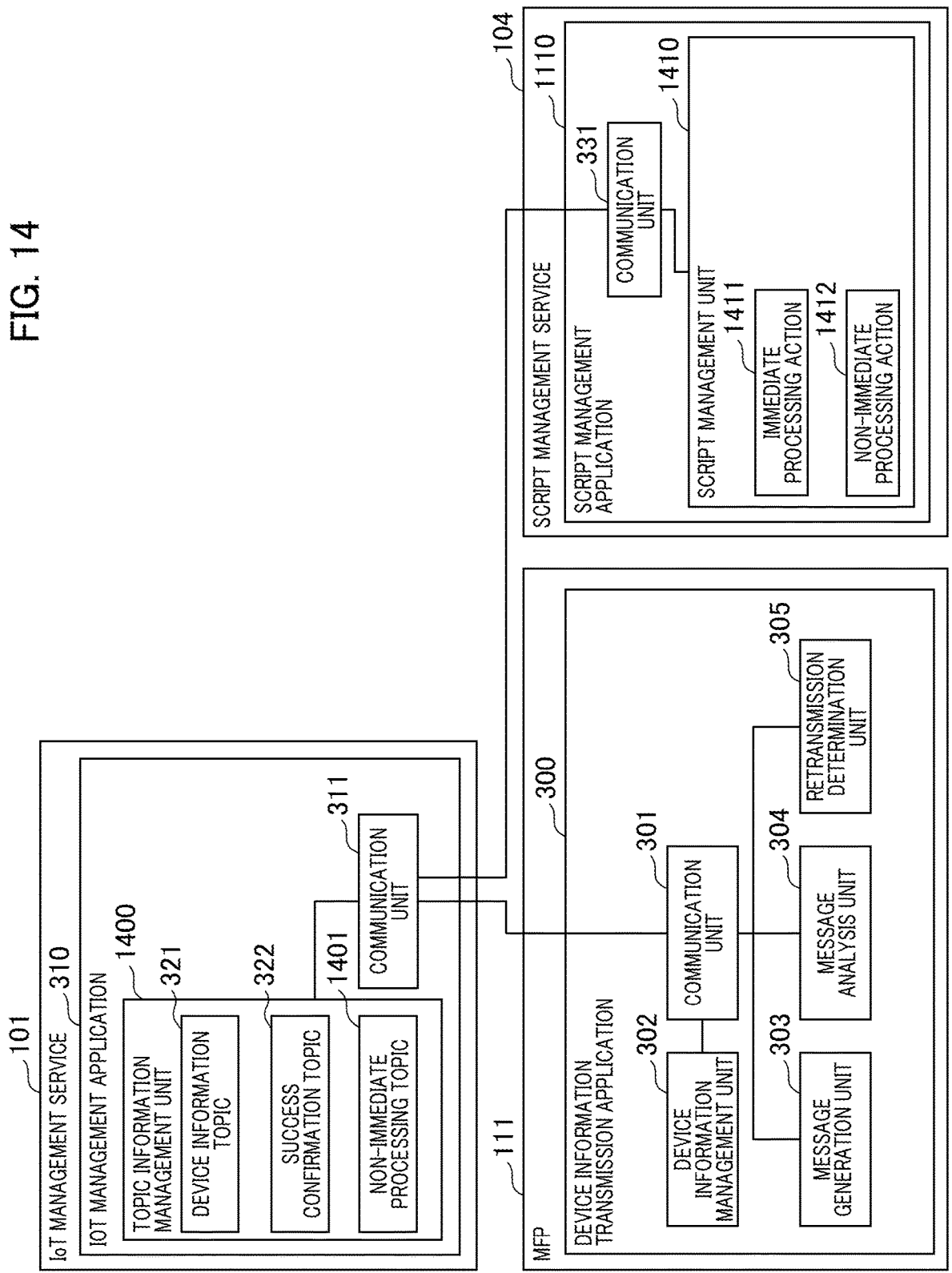
FIG. 14 illustrates a software configuration of the third embodiment.

FIG. 14 illustrates a software configuration of the third embodiment. Elements similar to those of the system described with reference to FIG. 3 are denoted by the same reference numerals, and the detailed description thereof will be omitted. A topic information management unit 1400 of the IoT management application 310 manages the device information topic 321, the success confirmation topic 322, and a non-immediate processing topic 1401. The non-immediate processing topic 1401 is a topic for transmitting the device information to the non-immediate processing action 1412.

A script management unit 1410 of the script management application 1110 manages an immediate processing action 1411 and the non-immediate processing action 1412. The immediate processing action 1411 generates the result of the script processing as a Pub message and publishes it to the non-immediate processing topic 1401. The other functions of the immediate processing action 1411 are similar to those of the immediate processing action 361 in FIG. 3, so the detailed description thereof will be omitted.

The non-immediate processing action 1412 is a script that is driven in response to a Pub of the message performed to the non-immediate processing topic 1401. The non-immediate processing action 1412 starts a Sub to the non-immediate processing topic 1401 and receives the message that has been published. The other functions of the non-immediate processing action 1412 are similar to those of the non-immediate processing action 362 in FIG. 3, so the detailed description thereof will be omitted.

Figure 15:
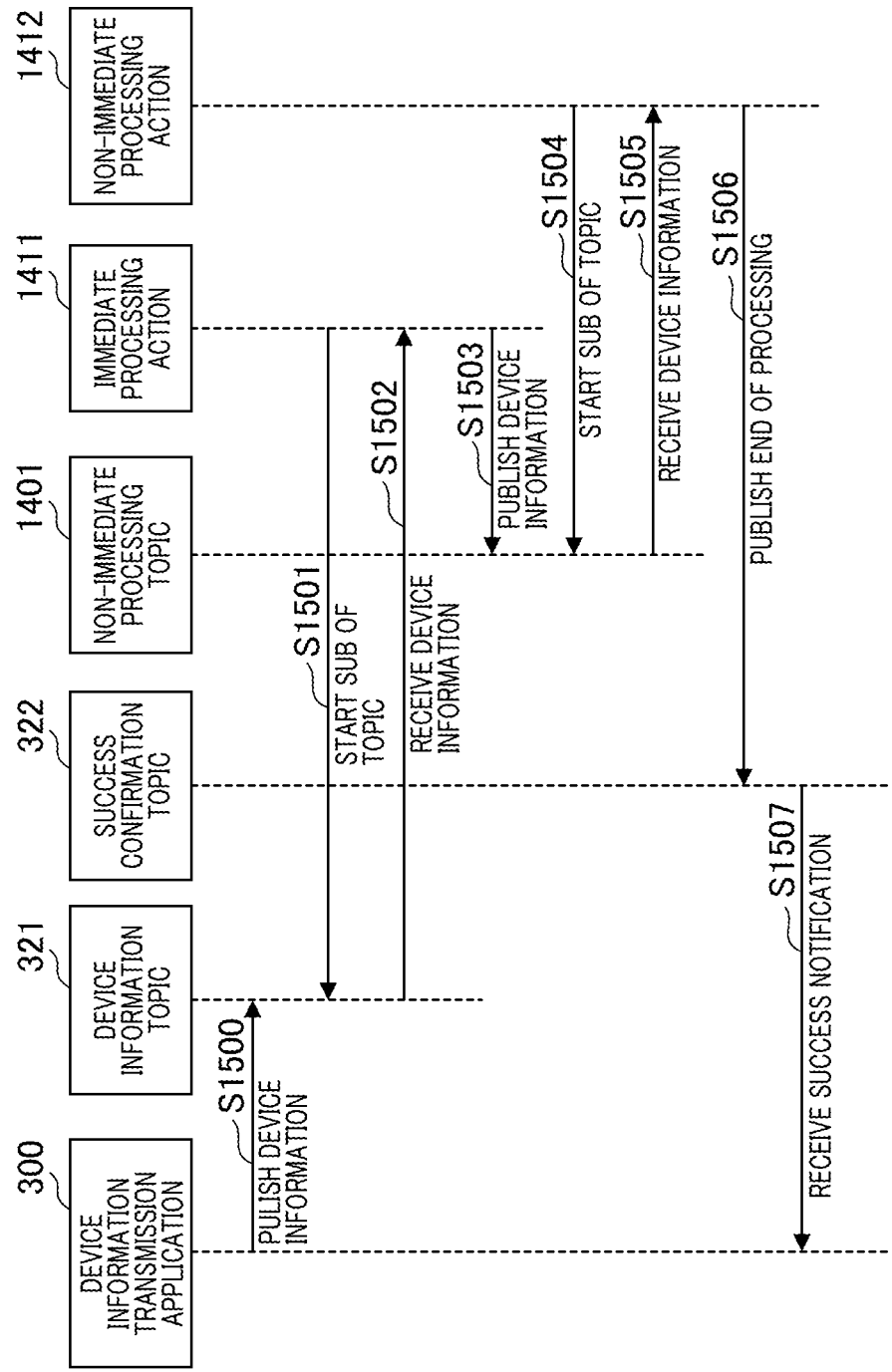
FIG. 15 illustrates a processing sequence of the entire system of the third embodiment.

FIG. 15 illustrates a processing sequence of the entire system in the third embodiment. As a premise of the processing sequence in FIG. 15, it is assumed that a Sub of the message from the success confirmation topic 322 by the device information transmission application 300 has started. The processes in steps S1500, S1501, and S1502 are respectively similar to those in steps S400, S402, and S410 in FIG. 4, so the detailed description thereof will be omitted.

In step S1503, the immediate processing action 1411 publishes the message 600 received in step S1502 to the non-immediate processing topic 1401. In step S1504, the script management application 330 is notified about the fact that the message has been registered in the non-immediate processing topic 1401 in step S1503. In response to this notification, the script management unit 1410 of the script management application 330 drives the non-immediate processing action 1412. The non-immediate processing action 1412 performs the start request of Sub to the non-immediate processing topic 1401. As a result, the receipt of the message from the non-immediate processing topic 1401 starts.

In step S1505, the non-immediate processing action 1412 receives the message 600 from the non-immediate processing topic 1401 and performs the process that stores messages in a manner similar to that in step S415 in FIG. 4. Subsequently, in step S1506, the non-immediate processing action 1412 generates a Pub message similar to the message 900 and publishes the message to the success confirmation topic 322. The process in step S1507 is similar to that in step S421 in FIG. 4, so the detailed description thereof will be omitted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), storage of delivered computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-145474, filed Jul. 27, 2017, which is hereby incorporated by reference herein in its entirety.

What is claimed is:

1. An information processing system comprising a network device and a message management system including a first message management service for delivering a message from the network device serving as a publisher to a plurality of network devices serving as a plurality of subscribers and a second message management service for delivering a message indicating the success of the processing of the message,
wherein the network device comprises:
a memory storing instructions; and
a processor executing the instructions causing the network device to:
request the second message management service to register a subscription; and
notify the first message management service about a first message;
wherein the message management system comprises:
a memory storing instructions; and
a processor executing the instructions causing the message management system to:
register a processing result of the first message in a first subscriber in an information management service in response to the completion of an immediate processing action in a first service of the first message delivered by the first message management service, wherein the immediate processing action performs processing on the first message upon receipt of the first message and stores the result of processing the first message after processing the first message;
register a processing result of the first message in a second subscriber in the information management service in response to the completion of a non-immediate processing action in a second service of the first message delivered by the first message management service, wherein the non-immediate processing action stores the first message upon receipt, subsequently performs processing of the stored first message, and stores the result of the subsequent processing of the stored first message; and
notify the second message management service about a second message indicating the success of the processing of the first message in accordance with the processing result of the first message registered in the information management service;
wherein the plurality of subscribers of the first message management service include the first subscriber and the second subscriber, and
wherein the second message about which notification has been provided is delivered from the second message management service to the network device in accordance with the registered subscription.

2. The information processing system according to claim 1,
wherein the message management system includes a third message management service to which notification about a message corresponding to the processing result of the first message is provided from each of the first service and the second service serving as publishers, and
wherein the registration of the processing result of the first message in the information management service is performed in response to the delivery of the processing result of the first message from the third message management service.

3. The information processing system according to claim 1,
wherein the information management service manages message identification information, identification information of each subscriber of the first message of the first message management service, and the processing result of the first message.

4. The information processing system according to claim 1,
wherein the processing result in the first subscriber is registered in the information management service by the first service in response to the completion of the processing of the first message in the first service,
wherein the processing result in the second subscriber is registered in the information management service by the second service in response to the completion of the processing of the first message in the second service, and
wherein the second message management service is notified about the second message by the second service in accordance with the processing result of the first message registered in the information management service.

5. The information processing system according to claim 1,
wherein the network device notifies the first message management service about a message indicating predetermined operation information to serve as the first message.

6. The information processing system according to claim 1, wherein, in a case where the processing result of the first message in both the first service and the second service indicates success as the result of the processing of the first message registered in the information management service, the second message is delivered to the second message management service.

7. The information processing system according to claim 1, wherein the network device is an image processing apparatus.

8. A control method in an information processing system comprising a network device and a message management system including a first message management service for delivering a message from the network device serving as a publisher to a plurality of network devices serving as a plurality of subscribers and a second message management service for delivering a message indicating the success of the processing of the message, the method comprising:

requesting the second message management service to register a subscription by the network device;

notifying the first message management service about a first message by the network device;

registering a processing result of the first message in a first subscriber in an information management service by the message management system in response to the completion of an immediate processing action in a first service of the first message delivered by the first message management service, wherein the immediate processing action performs processing on the first message upon receipt of the first message and stores the result of processing the first message after processing the first message;

registering a processing result of the first message in a second subscriber in the information management service by the message management system in response to the completion of a non-immediate processing action in a second service of the first message delivered by the first message management service, wherein the non-immediate processing action stores the first message upon receipt, subsequently performs processing of the stored first message, and stores the result of the subsequent processing the stored first message; and notifying the second message management service about a second message indicating the success of the processing of the first message in accordance with the processing result of the first message registered in the information management service;

wherein the plurality of subscribers of the first message management service include the first subscriber and the second subscriber, and wherein the second message about which notification has been provided is delivered from the second message management service to the network device in accordance with the registered subscription.

* * * * *